United States Patent [19]

Pack

[11] Patent Number: 4,951,355
[45] Date of Patent: Aug. 28, 1990

[54] PROCESS FOR LOOSENING SCALES AND REMOVING SLIME FROM FISH

[76] Inventor: James G. Pack, Rte. 3, Box 106, Troy, N.C. 27317

[21] Appl. No.: 386,819

[22] Filed: Jul. 28, 1989

[51] Int. Cl.$^5$ .............................................. A22C 21/04
[52] U.S. Cl. .......................................... 17/51; 17/65
[58] Field of Search ................................. 17/51, 64, 65

[56] References Cited

U.S. PATENT DOCUMENTS

| | | | |
|---|---|---|---|
| 1,011,378 | 12/1911 | Shaffer | 17/65 |
| 3,076,224 | 2/1963 | Walker | 17/45 |
| 3,706,333 | 12/1972 | Ammerman | 17/62 |
| 3,806,616 | 4/1974 | Mencacci et al. | 426/376 |
| 4,020,528 | 5/1977 | Lindbladh | 17/62 |
| 4,309,794 | 1/1982 | Raa et al. | 17/46 |
| 4,353,928 | 10/1982 | Seliger et al. | 426/238 |
| 4,505,004 | 3/1985 | Joensen | 17/48 |
| 4,839,942 | 6/1989 | Damp | 17/64 |

*Primary Examiner*—Willis Little
*Attorney, Agent, or Firm*—Shefte, Pinckney & Sawyer

[57] ABSTRACT

In the cleaning and dressing of fish, surface slime is removed and scales are loosened by submerging fish in a treatment bath of an aqueous solution of common apple cider vinegar, preferably in a concentration of approximately one percent (1%), for a treatment period of five to fifteen minutes, the fish slime being substantially removed and the fish scales being sufficiently loosened for removal by minimal mechanical action, leaving the fish skin and flesh intact and undamaged.

7 Claims, No Drawings

PROCESS FOR LOOSENING SCALES AND REMOVING SLIME FROM FISH

BACKGROUND OF THE INVENTION

The present invention relates generally to the cleaning or dressing of fish in preparation for cooking and, more particularly, to a process for removing surface slime and loosening scales from fish substantially without requiring mechanical action and without damaging the underlying skin and flesh.

While sport fishing is one of the most common and popular recreational pastimes throughout the world, fishermen almost universally disdain the process of cleaning and dressing fish in preparation for cooking, this process generally requiring removal of a fish's surface slime and scales, decapitation of the body, and evisceration of the entrails of the fish. Perhaps the most distasteful aspect of this process is the initial step of removing the surface slime and scales. Basically, this step requires the manual scraping of the fish's body using a sharpened serrated knife or similar implement to mechanically tear the scales and surface slime from the body, which of course is awkward and messy. Further, this technique has the disadvantage that the mechanical scraping action which is required often damages the skin and flesh of the fish underlying the scaled surface.

SUMMARY OF THE INVENTION

It is accordingly an object of the present invention to provide a process by which fish scales and slime may be removed substantially without requiring any significant degree of manual handling of the fish and without damaging the skin and flesh underlying the scales.

Briefly described, the process of the present invention comprises the steps of initially preparing a treatment bath of an aqueous solution of an edible food acid. Fish are submerged in the bath prior to decapitation and evisceration for a sufficient period of treatment time to substantially remove the fish slime and loosen the fish scales to facilitate scale removal with a minimum of mechanical action. As a result, the underlying fish skin and flesh is left substantially intact without damage.

Generally, the acidic concentration of the treatment bath may range up to approximately five percent (5%), the preferred concentration being on the order of approximately one percent (1%). Substantially any food acid may be utilized, with an acetic acid such as common apple cider vinegar being preferred. The treatment bath need not be heated or cooled but instead is preferably maintained at a temperature generally approximating the natural aquatic habitat of the fish.

The treatment period may be varied as necessary or desirable to achieve optimal results. A treatment period ranging between approximately five and fifteen minutes generally provides satisfactory results. Thereafter, the fish is removed from the bath, a light scraping of the outer surface of the fish body is performed to remove the loosened scales remaining on the fish, and thereafter the remainder of the fish cleaning process, e.g., decapitation and evisceration, is completed.

DESCRIPTION OF THE PREFERRED EMBODIMENT

By way of example, a preferred formulation of treatment bath for use in performing the process of the present invention may be prepared by mixing one quart (32 fluid ounces) of common apple cider vinegar having an acidic concentration of five percent (5%), such as may be readily obtained at substantially any grocery or food store, with one gallon (128 fluid ounces) of ordinary water, thereby producing a diluted aqueous solution of the apple cider vinegar having an acidic concentration of about one percent (1%). Of course, the treatment bath may be prepared in a greater or lesser quantity as necessary or desirable, depending principally upon the number of fish to be treated. The water utilized may be normal tap water obtained from a well or a municipal water system or, more conveniently, may be taken directly from the stream, pond, lake or other body of water from which the fish to be treated are caught.

The prepared treatment bath is stored in a watertight container, such as a portable insulated cooler, a livewell tank such as commonly provided in most conventional fishing boats, or any other suitable storage tank or container. The bath may be prepared at the start of a fishing excursion and carried with the fishermen as they fish. In this circumstance, live fish may be placed immediately into the treatment bath as they are caught. Alternatively, live fish may be placed as they are caught into a livewell or storage tank containing only untreated water and left in such storage tank for later treatment. In such circumstance, the treatment bath would be prepared at the conclusion of the fishing excursion and all of the fish which have been caught are placed together in the bath. In either case, it is preferred that the fish be left in the bath for a treatment period of between approximately five and fifteen minutes, which has been found to achieve optimal results. After this time period, the surface slime of the fish will be substantially removed. Likewise, a reasonable proportion of the scales of the fish will have separated from the fish bodies and the remaining scales will be substantially loosened so that only a light scraping with a straight-edged implement, such as a butter knife, will be sufficient to quickly and easily remove the scales with a minimum or manual handling of the fish and a minimum of mechanical action on the fish scales.

The fish are then ready for completion of the cleaning and dressing process. Generally, the fish would be immediately decapitated and then eviscerated to remove the entrails of the fish, whereupon the fish are ready for cooking, freezing or other storage.

While apple cider vinegar or another form of acetic acid is preferred for preparation of the treatment bath, substantially any edible food acid may alternatively be used and should provide comparable results. For example, it is contemplated that lemon juice or another form of citric acid could be utilized. However, a common vinegar product will normally be preferred as providing the dual advantages of lower cost and greater availability. Likewise, the acidic concentration of the treatment bath as well as the length of time for the treatment period, may be varied as necessary or desirable to obtain optimal results. The aforementioned concentration of one percent (1%) of the treatment bath and a treatment time of five to fifteen minutes have been found to provide the most reliably and repeatably good results when vinegar is utilized as the acid. However, it may be desirable to increase or decrease the acidic concentration or the treatment time period, or both, when another food acid is utilized.

As will thus be understood, the process of the present invention provides the significant advantage of minimizing the need for manual handling of fish and mechanical action on their scaled body surface in order to accomplish the initial step of de-sliming and de-scaling fish when cleaning and dressing them. As a result, this procedure is much less distasteful and bothersome than the conventional manner of removing fish scales and slime and, moreover, produces a more desirable product in that the fish skin and flesh underlying the scaled surface is left substantially intact and undamaged.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

I claim:

1. A process for loosening scales and removing slime from uneviscerated fish still having their scales and slime intact substantially without requiring mechanical action and without damaging skin and flesh underlying the scales, said process comprising the steps of preparing a treatment bath of an aqueous solution of an edible food acid having an acidic concentration of up to approximately five percent (5%) and, prior to eviscerating the fish, submerging the fish in the bath for a treatment period of no less than approximately five and no greater than approximately fifteen minutes, wherein said submerging substantially removes the fish slime and loosens the fish scales sufficiently to facilitate scale removal with a minimum of mechanical action while leaving the underlying fish skin and flesh substantially intact.

2. A process for loosening scales from fish according to claim 1 and characterized further in that said treatment bath has an acidic concentration of approximately one percent (1%).

3. A process for loosening scales from fish according to claim 1 and characterized further in that said acid is acetic acid.

4. A process for loosening scales from fish according to claim 3 and characterized further in that said acetic acid is apple cider vinegar.

5. A process for loosening scales from fish according to claim 1 and characterized further in that said step of submerging the fish is performed while the fish remain alive.

6. A process for loosening scales from fish according to claim 1 and characterized further by removing the fish from the bath after said treatment period, lightly scraping the outer surface of the fish to remove remaining loosened scales and eviscerating the fish.

7. A process for loosening scales from fish according to claim 1 and characterized further by maintaining said bath at a temperature generally approximating the natural aquatic habitat of the fish.

* * * * *